Aug. 19, 1958   G. W. WELSH ET AL   2,848,081
SELF-PROPELLED POWER SAW
Filed March 15, 1954   8 Sheets-Sheet 1

INVENTORS
George W. Welsh
Stanley E. Hill
BY Nathan A. Kraus
Frank H. Marks
ATTORNEYS

INVENTORS.
George W. Welsh
Stanley E. Hill
BY Nathan N. Kraus
Frank H. Marlos
ATTORNEYS Aug. 19, 1958  G. W. WELSH ET AL  2,848,081
SELF-PROPELLED POWER SAW

Filed March 15, 1954  8 Sheets-Sheet 3

INVENTORS.
George W. Welsh
Stanley E. Hill
BY Nathan N. Kraus
Frank H. Marks
ATTORNEYS Aug. 19, 1958　　G. W. WELSH ET AL　　2,848,081
SELF-PROPELLED POWER SAW
Filed March 15, 1954　　8 Sheets-Sheet 5

INVENTORS.
George W. Welsh
Stanley E. Hill
BY Nathan N. Kraus
Frank H. Marks
ATTORNEYS.

Aug. 19, 1958   G. W. WELSH ET AL   2,848,081
SELF-PROPELLED POWER SAW

Filed March 15, 1954   8 Sheets-Sheet 6

INVENTORS.
George W. Welsh
Stanley E. Hill
BY
ATTORNEYS.

Aug. 19, 1958 G. W. WELSH ET AL 2,848,081
SELF-PROPELLED POWER SAW
Filed March 15, 1954 8 Sheets-Sheet 7

INVENTORS:
George W. Welsh
Stanley E. Hill
BY Nathan A. Kraus
Frank H. Marks

United States Patent Office 2,848,081
Patented Aug. 19, 1958

2,848,081

SELF-PROPELLED POWER SAW

George W. Welsh, Kankakee, Ill., and Stanley E. Hill, Bayfield, Colo., assignors to Sears, Roebuck and Co., Chicago, Ill., a corporation of New York Application March 15, 1954, Serial No. 416,014

2 Claims. (Cl. 192—12)

Our invention relates to a self-propelled power saw for felling and sawing trees and the like.

One of the objects of our invention is the provision of a self-propelled two-wheeled power saw having improved power transmitting means for transmitting power from the engine unit to the traction wheels and to the cutter blade simultaneously or selectively according to the requirements.

Another object of our invention is the provision of improved means enabling the saw blade to be moved selectively to horizontal and vertical positions and to be secured for operation in either of said positions.

A further object of our invention is the provision of improved power transmission means embodying a unitary axle in combination with differential gearing.

A still further object of our invention is the provision of novel means for braking one of the traction wheels whereby the same provides a fixed pivot point so that the cutter blade when being moved into cutting engagement with a standing tree is maintained in a horizontal plane thereby avoiding any liability of warping of the cutter blade during a sawing operation.

A still further object of our invention is the provision of improved clutch means embodying means for compensating for wear of the clutch elements.

A still further object of our invention is the provision of a novel control lever and associated linkage for selectively controlling both the operation of the clutch and the traction wheel brake.

Other and further objects and advantages of our invention will be apparent from the following description when considered in connection with the accompanying drawings in which.

Figures 1, 2, 6:
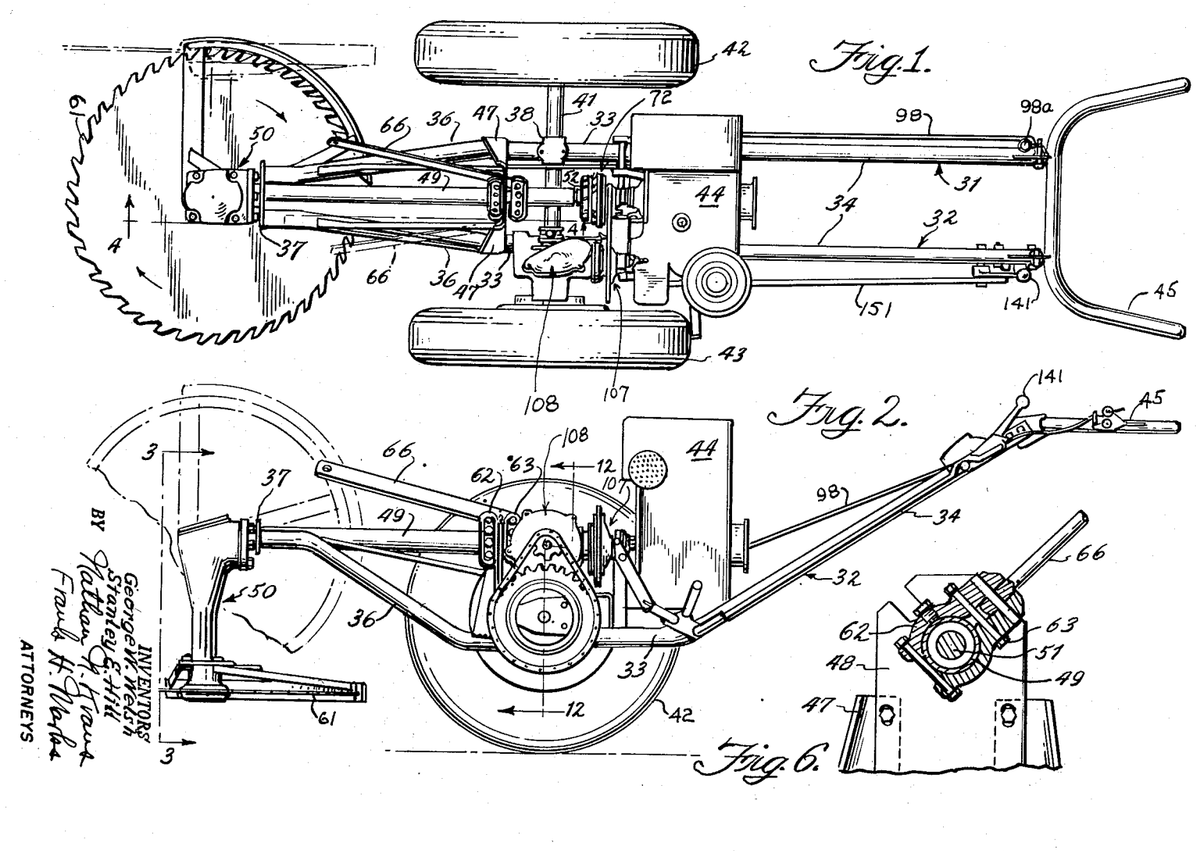
Fig. 1 is a top plan view of a power saw embodying the features of our invention.
Fig. 2 is a slide elevational view thereof, with one traction wheel removed to show details of construction.
Fig. 6 (Sheet 1) is a cross-sectional view taken on line 6—6 of Fig. 4.

Referring to the drawings, there is shown a frame formed of a pair of tubular members, generally indicated by 31 and 32, the said members being shaped in elevation substantially as illustrated in Fig. 2. with the intermediate and rearward portions 33 and 34 respectively, of each being substantially parallel and the forward portions 36 converging and being welded to a plate member 37. Suitably bolted to the intermediate portions 33 of the frame members 31 and 32 are axle journals 38 and 39 respectively, which rotatably support a unitary axle 41 on respective ends of which are mounted traction wheels 42 and 43. Supported on the frame members 31 and 32 rearwardly of the axle 41 is a power unit 44 which is preferably in the form of a gasoline engine. A pair of guiding handles 45 are suitably secured to the frame members 31 and 32.

Figures 3, 4, 5:
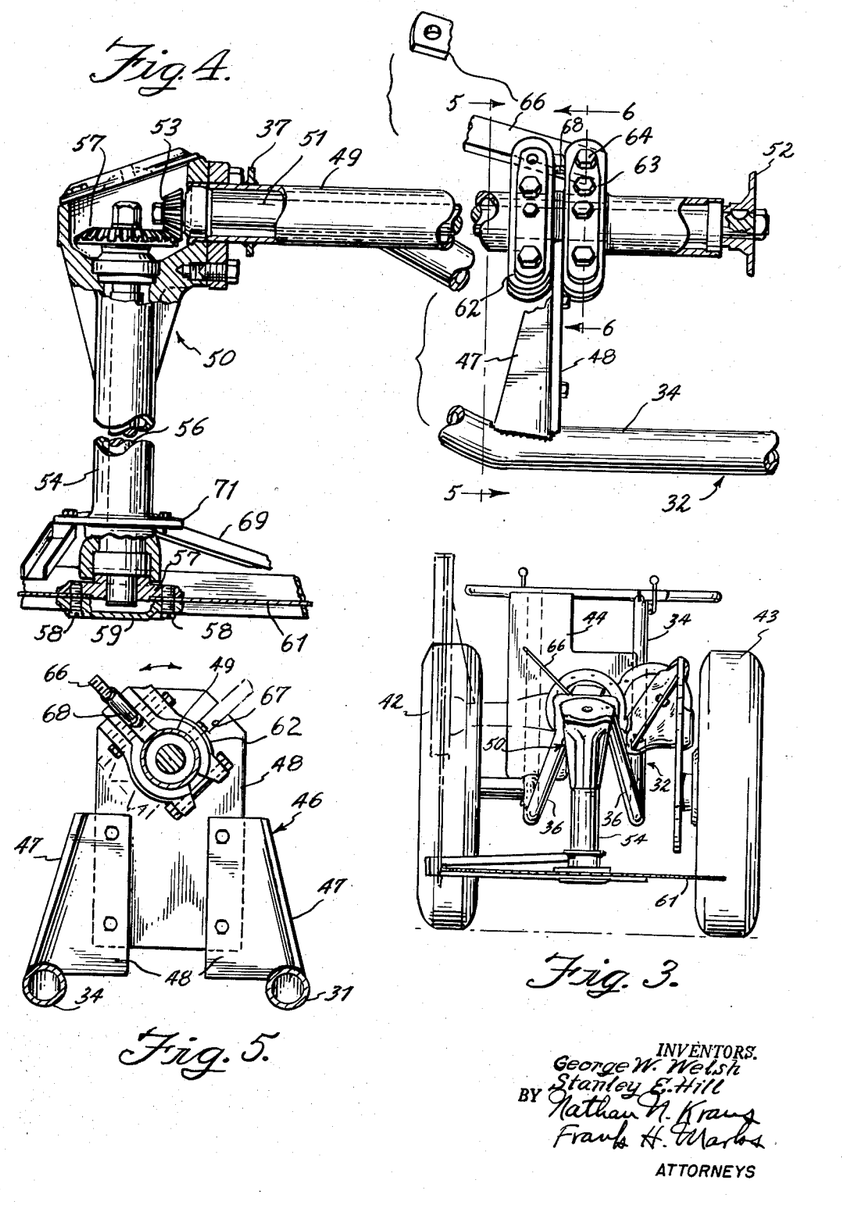
Fig. 3 is a front end elevational view thereof looking in the direction of the arrows 3—3 of Fig. 2.
Fig. 4 is a cross-sectional view on an enlarged scale taken on line 4—4 of Fig. 1.
Fig. 5 is a cross-sectional view taken on line 5—5 of Fig. 4.
Figure 7:
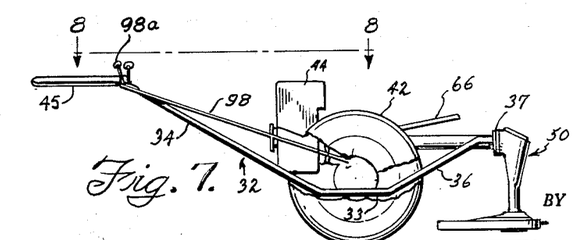
Fig. 7 (Sheet 3) is a side elevational view on a reduced scale looking in a direction opposite from that of Fig. 2.

Referring particularly to Figs. 4 and 5 wherein is shown the structural details of the supporting and indexing means for the saw blade, the numeral 46 indicates generally a standard formed of angle sections welded to the tubular frame members 31 and 32, the said sections carrying an indexing plate 48 bolted thereto. The said plate member is provided with an aperture in which is journaled the horizontal tubular section 49 of an L-shaped torque tube structure indicated generally by the numeral 50. The horizontal section 49 is journaled at its other end in the plate member 37.

Journaled for rotation in suitable bearings mounted within the horizontal tubular section 49 is a propeller shaft 51 on the inner end of which is mounted a sprocket wheel 52 and on the outer end of which is mounted a bevelled gear 53. The vertically disposed tubular section 54 of the L-shaped torque tube structure 50 is suitably bolted to the section 49 and is similarly provided with internal bearings in which is journaled a mandrel 56, the upper end of which is provided with a bevel gear 57 arranged for cooperative engagement with the bevel gear 53. Secured to the lower end of the mandrel 56 is a flanged member 57 provided with threaded apertures in which are received the bolts 58 which by means of a clamping disc 59 secures a circular saw blade 61 to the mandrel.

Clamped as with bolts to the tubular section 49 on opposite sides of the plate 48, as illustrated clearly in Fig. 4 are pairs of brackets 62 and 63. The said brackets are identical in construction and each pair comprises two complemental members. The upper ends of the bracket members 63 are pierced to receive a bolt 64 which pivotally supports a lever arm 66 between the bracket members. The said lever arm is adapted to be received in one of two slots 67 and 68 provided in the indexing plate 48 and positioned 90° apart to secure the L-shaped structure 50 in one of two positions of operation. As seen more clearly in Fig. 5 each pair of bracket members 62 and 63 when clamped on the tubular section 49 provides a space for accommodating the lever arm 66 therein when the lever arm is received in one of the slots 67 and 68. Thus, the lever arm 66 is supported on both sides of the index plate 48 against lateral movement so that the L-shaped structure 50 is effectively secured against inadvertent rotation. It will be apparent that because the lever arm 66 is relatively long, adequate leverage is provided for facilitating rocking of the saw blade 61 and its supporting structure from one position to another. A saw blade guard 69 is suitably secured to a flange 71 on the lower portion of the vertical tubular section 54, the said guard extending circumferentially no more than substantially 90 degrees around the edge of the circular saw blade.

Figure 8:
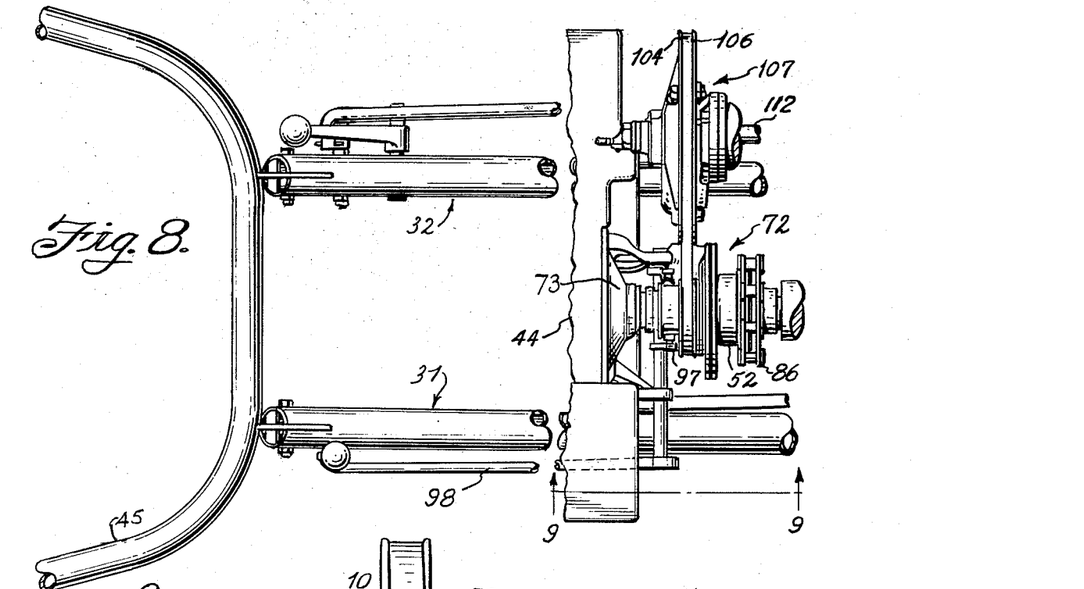
Fig. 8 is a fragmentary top plan view on an enlarged scale taken on line 8—8 of Fig. 7.
Figure 9:
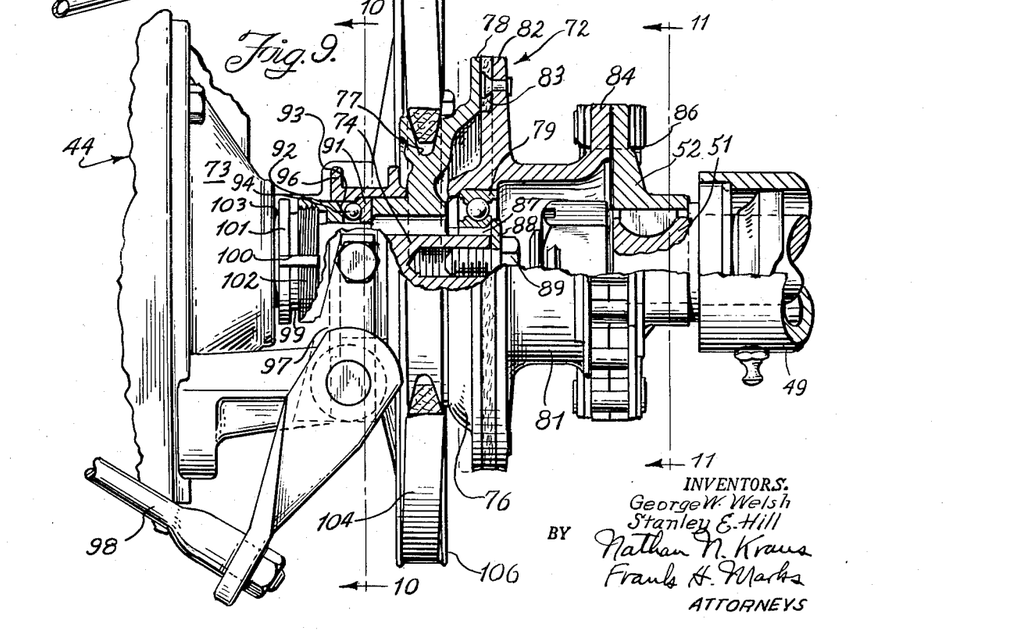
Fig. 9 is an elevational view on an enlarged scale looking in the direction of arrows 9—9 of Fig. 8 with portions broken away to show details of construction.
Figure 10:
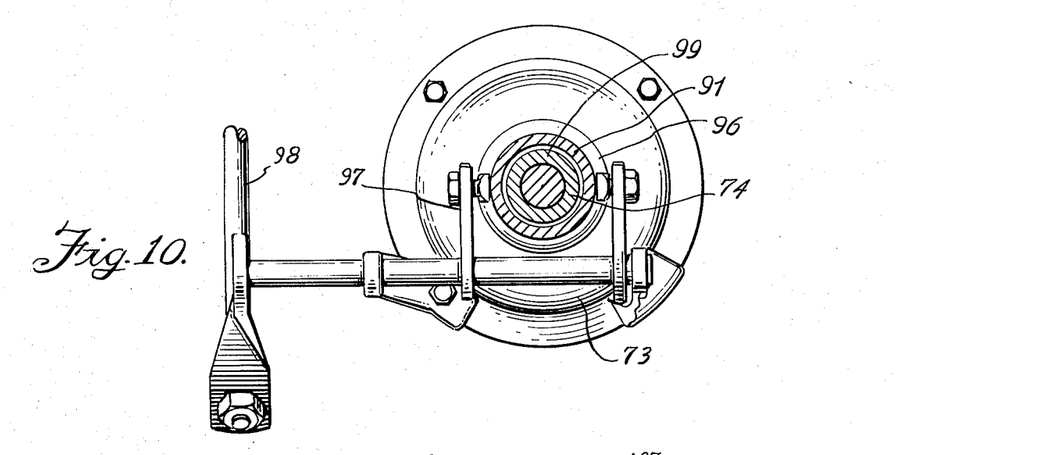
Fig. 10 (Sheet 3) is a cross-sectional view taken on line 10—10 of Fig. 9.
Figure 11:
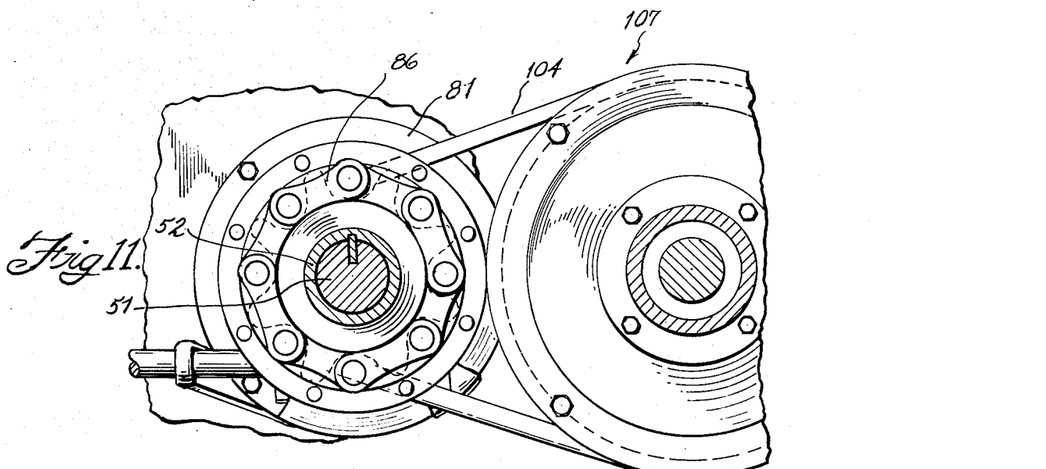
Fig. 11 is a cross-sectional view taken on line 11—11 of Fig. 9.

Referring particularly to Figs. 8, 9 and 10, the main clutch assembly indicated generally by numeral 72 is seen arranged forwardly of the bell housing 73 of the power unit 44. Projecting through the bell housing 73 is the drive shaft 74 of the power unit and keyed to said shaft is a driving sheave 76 having an integrally formed belt groove 77 and a clutch face 78. Supported for free rotation on the end of the said drive shaft through the medium of a ballbearing assembly 79 is a driven element 81 shaped in cross section substantially like that illustrated in Fig. 9. The said element includes a clutch face 82 having an annular recess for receiving an annular ring of clutch facing material 83 which is secured thereto as illustrated. The opposite end of the driven element 81 is hollow and is provided with a sprocket 84, the teeth of which are identical to those of the sprocket 52. The said sprockets 84 and 52 are adapted to be arranged in juxtaposition and to be embraced by a sprocket chain 86 which serves to couple the said sprockets together so as to effect rotation of the said sprockets as a unit.

As will be apparent by reference to Fig. 9, the ballbearing assembly 79 includes an inner race 87 carried on shaft 74. A retainer washer 88 is provided for securing the element 81 on the shaft 74, the retainer washer being secured by a nut 89. Adjacent the driving sheave 76 is a thrust washer 91 and in confronting relation thereto is a thrust collar 92 having an annular inclined bearing surface 93. Between said washer and collar are disposed a plurality of balls 94 which are adapted to be urged inwardly by an axially slideable pressure ring 96 movable through a yoke arrangement 97 connected through a rod 98 to an operating handle 98a. Movement of the pressure ring 96 in a direction to the right as viewed in Fig. 9 will effect a camming action on the balls inwardly and cause the driving sheave 76 to slide axially to the right and engage with the cooperating clutch face 83 of the driven element 81.

Adjustment for wear of the clutch faces is accomplished by means of a tempered adjustment nut 99 having a hexagon head 101 and opposite thereof a threaded end portion 102 adapted to be received in a complementally threaded end portion of the thrust collar 92. The nut 99 is slotted longitudinally as at 100 and slightly expanded to out of round condition before heat treating so that when it is threaded into the thrust collar 92 as will be presently described, the two parts are substantially locked together in a position of adjustment. Relative adjustment of the said parts may be effected by compressing the flats of the nut across the slot as with a wrench or suitable tool so as to reduce the diameter of the nut and relieve the frictional engagement between the nut 99 and thrust collar 92 thereby permitting adjustment of the effective length of these two parts when in assembled relation. It will be apparent that the adjusting nut 99 abuts a shoulder 103 adjacent the ball housing 73. When the nut 99 is rotated counter-clockwise it shifts the thrust collar 92 axially to the right, as viewed in Fig. 9, thereby effecting an adjustment in the position of the shoulder against which the balls 94 abut. Thus, the driving sheave 76 when the balls 94 are in the position shown in Fig. 9 is caused to be moved axially to the right, as viewed in Fig. 9, a sufficient distance to compensate for wear on the clutch faces. It will be apparent that driving connection between the power unit 44 and the saw blade 61 may be effected by manipulation of the pressure ring 96 through the medium of the yoke arrangement 97 by lever 98.

A belt 104 in engagement with the belt groove of the driving sheave 76 cooperates with the sheave 106 of a power transmission arrangement hereinafter to be described. Included in said arrangement is a second clutch indicated generally by the numeral 107. This clutch may be constructed substantially like the main clutch 72 hereinbefore described, the clutch 107 being operatively connected with a drive case assembly generally indicated by numeral 108 illustrated in Fig. 13. The drive case 109 of said assembly is integral with a bracket 110 Fig. 12 the lower end of which is integral with journal 39. Suffice it to say that the said drive case assembly includes a driving pinion 111 fixed on shaft 112 extending from clutch 107, a ring gear 113 keyed to shaft 114 and a sprocket 116 keyed to said shaft.

Figures 12, 13, 14, 19:
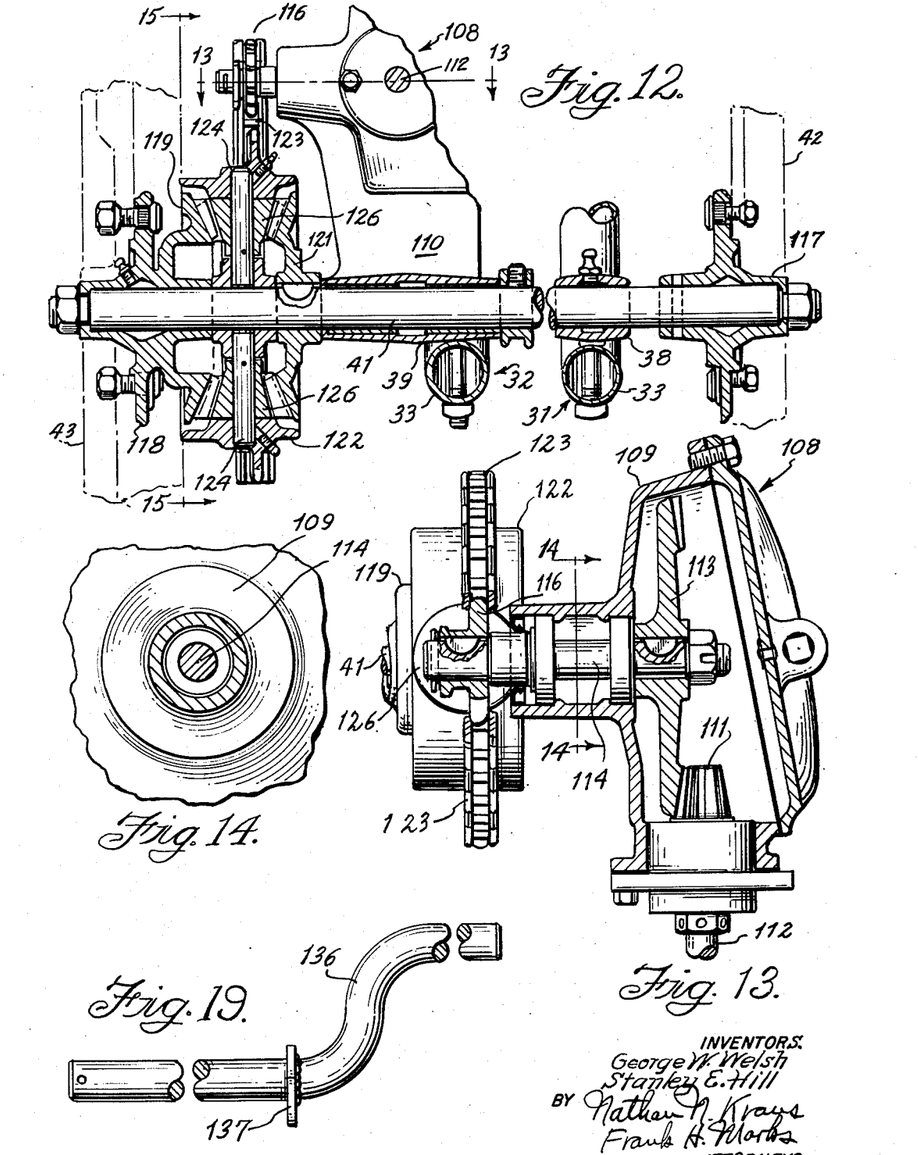
Fig. 12 (Sheet 5) is a cross-sectional view on an enlarged scale taken on line 12—12 of Fig. 2.
Fig. 13 is a cross-sectional view on an enlarged scale taken on line 13—13 of Fig. 12.
Fig. 14 is a cross-sectional view taken on line 14—14 of Fig. 13.
Fig. 19 (Sheet 5) is an elevational view of a detail of construction.
Figure 15:
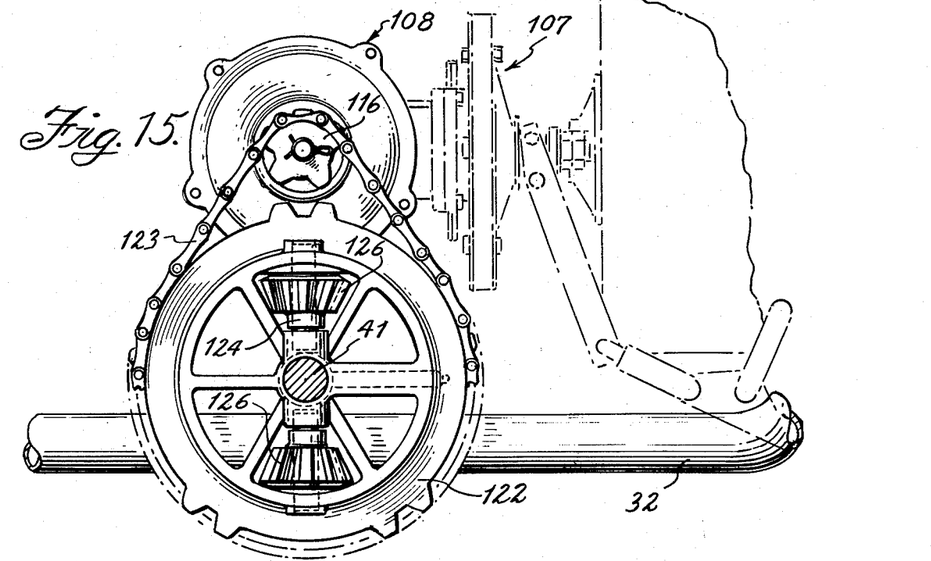
Fig. 15 is a cross-sectional view taken on line 15—15 of Fig. 12.

Referring to Fig. 12, keyed to the right hand end of axle 41 is a hub 117 which forms part of traction wheel 42. Mounted on the opposite end of said axle and arranged for free rotation thereon is a hub 118 forming part of traction wheel 43. The said hub has integrally formed therewith a bevelled ring gear 119 which comprises an element of a differential assembly. Keyed to the axle 41 in spaced confronting relation to ring gear 119 is a complemental bevelled ring gear 121. Mounted on the axle 41 for free rotation thereon intermediate the said ring gears is a sprocket wheel 122 having sprocket teeth, the said wheel being adapted to be driven by a sprocket chain 123 in operative engagement with the sprocket 116 of the gear casing assembly. The said wheel is provided with diametrally arranged bores to receive pins 124 arranged to be freely rotatable within said bores, the said pins being coaxially alined and in opposed relation and each being adapted to mount a planetary bevelled pinion 126 which is fixed thereto. The planetary pinions 126 are in operative engagement with the bevelled ring gears 119 and 121 and as will be apparent, the said pinions may revolve in an orbit about the axis of shaft 41 and may also rotate each about the axis of a pin 124.

Figures 16, 17, 18:
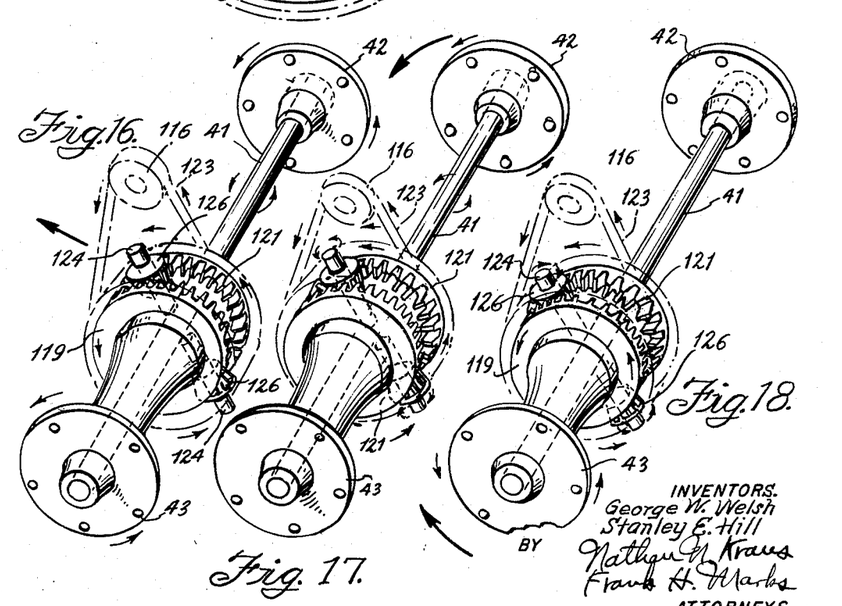
Figs. 16, 17 and 18 are more or less diagrammatic views illustrating different conditions of operation of the differential gearing.

The operation of our novel differential assembly will best be understood by the following description of the same. Assuming a condition as is illustrated in Fig. 16 in which power is being transmitted to the sprocket pinion 116 with the traction wheels 42 and 43 being unrestricted so that both may rotate simultaneously and follow a straight path, it will be seen that the sprocket chain 123 travels in the direction of the arrows causing the sprocket wheel 122 to rotate in the same direction with the pinions 126 revolving in an orbit about the axis of shaft 41. During such operation the pinions 126 do not rotate on their respective pins 124 but remain stationary and are substantially locked to the ring gears 119 and 121 thereby effecting simultaneous rotation of the said ring gears in the direction of the arrows. Since traction wheel 43 is directly connected to ring gear 119, this traction wheel will rotate with the ring gear 119. Correspondingly ring gear 121 will rotate in the direction indicated by the arrows and since shaft 41 is keyed thereto and to traction wheel 42, the said traction wheel will rotate with ring gear 121, thereby effecting simultaneous rotation of the traction wheels 42 and 43 in the same direction.

Considering a condition in which a left turn is being negotiated, as particularly illustrated in Fig. 17, the traction wheel 43 being on the inside of the curve is either stationary or is caused to turn more slowly than the traction wheel 42. Sprocket chain 123 drives the sprocket wheel 122 in the direction of the arrows effecting a revolution of the pinions 126 about axis of shaft 41 with pinions 126 rotating in opposite directions as indicated by the arrows each about the axis of a respective pin 124 thereby effecting rotation in the direction of the arrows of ring gear 121 with shaft 41 and traction wheel 42. In this condition of operation traction wheel 43 may be completely at rest or rotating at a slower rate of speed than traction wheel 42.

Referring to Fig. 18, there is illustrated a condition in which a right turn is being negotiated. In this condition of operation the traction wheel 42 which is now on the inside of the curve is either stationary or is rotating at a lower speed than the traction wheel 43 which is now on the outside of the curve. Sprocket chain 123 revolves the pinions 126 in the direction of the arrows about the axis of shaft 41 and simultaneously the pinions 126 are caused to rotate about their respective axes in opposite directions as indicated by the arrows these directions being reversed from that illustrated in Fig. 17. In this condition of operation the ring gear 119 is caused to rotate in the direction of the arrows and simultaneously drive traction wheel 43. Traction wheel 42 however may be completely at rest or may rotate at a different speed than traction wheel 43.

Figure 22:
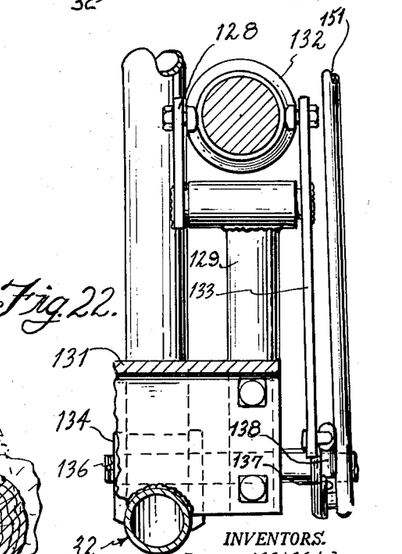
Fig. 22 is a cross-sectional view on an enlarged scale taken on line 22—22 of Fig. 20.

The second clutch 107 is operated through a yoke 128 pivotally supported on an upright member 129 bolted to an extension 131 of the base of the power unit (Fig. 22). The yoke 128 embraces an annularly grooved slide member 132 associated with the clutch 107 and one of the legs of the yoke is extended downwardly to provide a lever 133. Welded to the tubular frame member 32 is a bearing member 134 arranged to rotatably support a brake bar 136 (Fig. 19) which is formed of heavy rod stock with the end portions being axially offset from each other. The said brake bar has welded thereto intermediate thereof a crank arm 137 which is pierced at opposite ends. One of the pierced ends of said crank arm is connected by means of a link 138 to the lever arm 133 of the yoke. The opposite end of the crank arm 137 is connected by means of a pull rod 151 to a control handle 141 hereinafter to be described. The brake bar 136 extends transversely across the tread of the traction wheel 43 and when manipulated as will be hereinafter explained is caused to press into the said tread and effect a braking action on the wheel.

Figure 21:
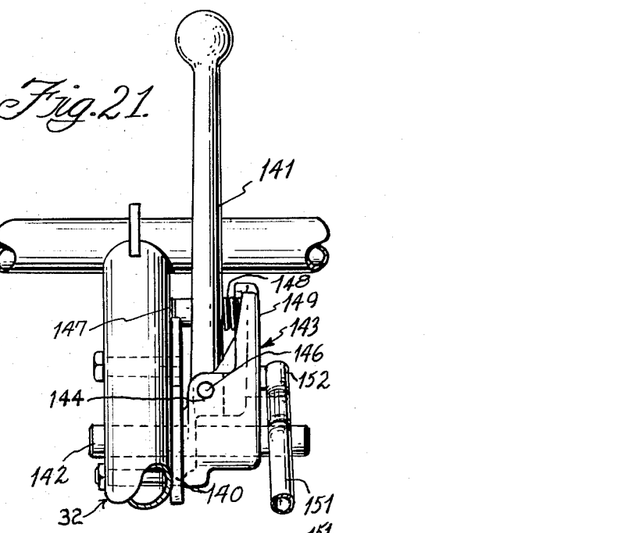
Fig. 21 is a cross-sectional view on an enlarged scale taken on line 21—21 of Fig. 20.
Figure 23:
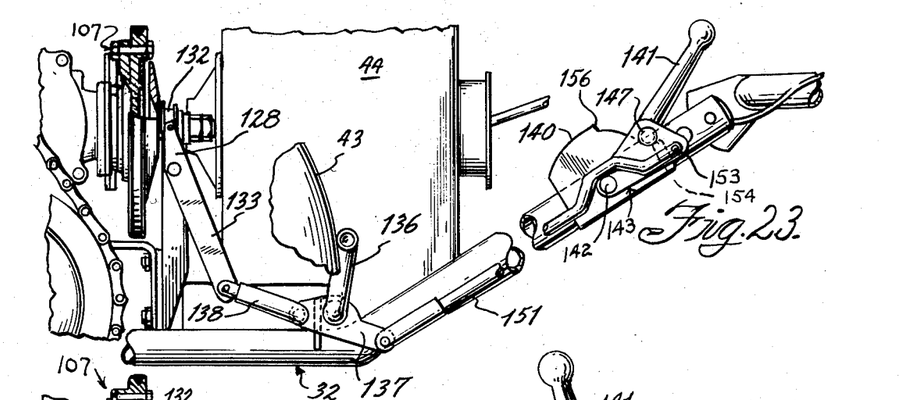
Figs. 23, 24 and 25 are fragmentary elevational views of the controlling lever and associated linkage showing various conditions of operation thereof.
Figure 24:
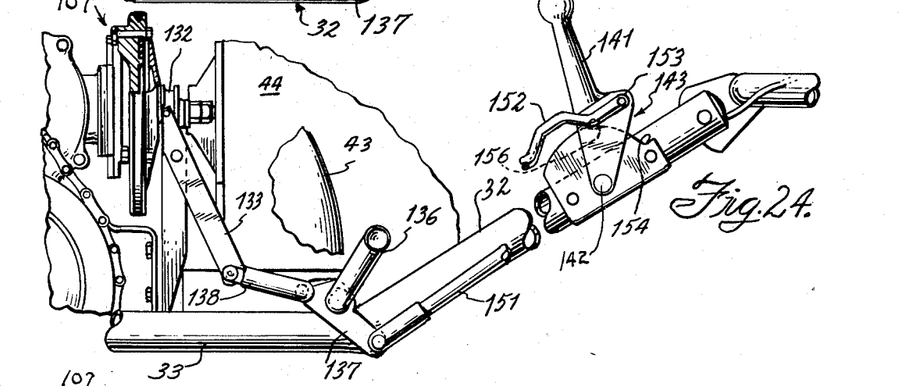
Figure 25:
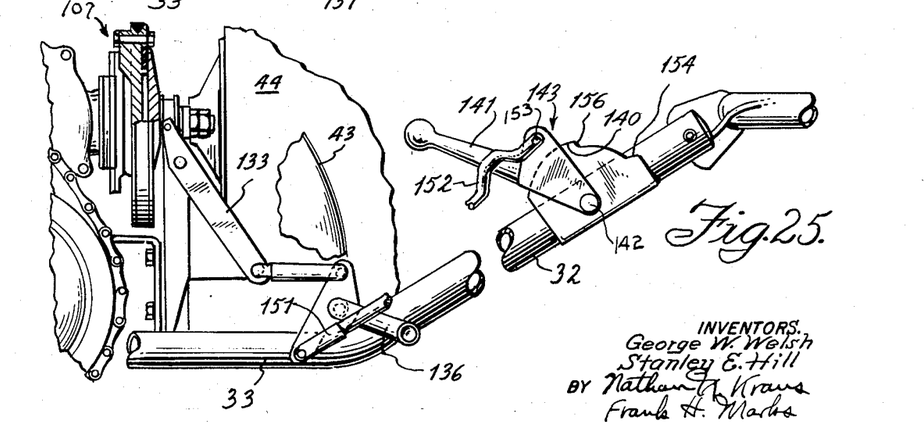

Suitably secured as with bolts to the frame member 32 is a plate 140 shaped substantially as illustrated in Figs. 23-25, the said plate having a shaft 142 (Fig. 21) extending transversely thereof and welded thereto. As viewed in Fig. 21 the left hand portion of the shaft 142 extends through a transverse opening provided in the frame member 32. Pivotally mounted on the opposite end of said shaft is a handle pivot member generally indicated by 143 which is in the form of a casting having a pair of ears 144 which are pierced to receive a pin 146 which pivotally supports the control handle 141. As will be apparent the control handle 141 is rockable about the axis of shaft 142 in a plane substantially longitudinally of the frame. Additionally, the said control handle is rockable about the axis of pin 146 in a plane transverse to the longitudinal axis of the frame. The handle 141 is pierced intermediate thereof to receive a socket head cap screw 147 which projects laterally from the handle and overhangs the plate member 140, as illustrated in Fig. 21. On the opposite side, the handle is provided with a well in which is received one end of a compression spring 148, the other end of the spring being received in a corresponding well provided in an upward extension 149 of the handle pivot member 143. Secured in an opening provided in the handle pivot member 143 is one end of a pull rod 151, the said pull rod having an offset portion 152 near the upper end thereof for purposes of clearance.

Referring particularly to Figs. 23, 24 and 25 the control handle 141 and associated parts are seen in three different positions of operation. In Fig. 23 the control handle is shown in its rearmost position. In this position the clutch 107 is rendered inoperative so that no driving power is transmitted to the traction wheels 42 and 43 while the brake bar 136 is caused to press into the tread of traction wheel 43 thereby braking the same against rotation.

As will be apparent by reference to Fig. 23, the pull rod 151 and handle pivot member 143 constitute a toggle arrangement for effectively locking the brake bar 136 against the tread of traction wheel 43. In the position illustrated in Fig. 23 the pivotal connection 153 of the pull rod 151 and the handle pivot member 143 is disposed in over center relation to the pivotal axis 142 of the handle pivot member 143 with the offset portion 152 abutting the shaft 142 which serves as a stop for the handle pivot member 143. Release of the toggle is effected by moving the control handle 141 in a counter-clockwise direction as viewed in Fig. 23.

When the control handle 141 is in the intermediate position illustrated in Fig. 24, the brake bar 136 is disengaged from the tread of the traction wheel 43 and the clutch 107 is rendered inoperative so that no power may be transmitted from the power unit to the traction wheels. In this position the operator may move the saw apparatus manually on the traction wheels. It will be seen that in the intermediate position the head of screw 147 abuts shoulder 156 on plate 140, the shoulder acting as a stop to limit forward movement of the control handle 141.

Movement of the control handle 141 beyond the shoulder 156 and to the position illustrated in Fig. 25 may be effected by rocking the said handle to the right, as viewed in Fig. 21, against the pressure of the spring 148 so as to move the head of screw 147 out of the plane of plate 140 and thereby clear the shoulder 156 of the said plate. In the extreme forward position of the control handle 141, as illustrated in Fig. 25, the clutch 107 is rendered operative and the brake bar 136 is removed from engagement with the tread of the traction wheel 43 so that power from the power unit may be transmitted to the traction wheels and driving of the same may be effected.

When it is desired to operate the saw in cutting underbrush the saw blade is adjusted to the horizontal position illustrated in solid lines in Figs. 1 and 3. Clutch 72 is first rendered operative by the operating handle 98a to transmit power to the saw blade. Should the operator desire to have the machine power propelled, the control handle 141 is manipulated to assume the extreme forward position illustrated in Fig. 25 wherein the clutch 107 is rendered operative and the brake bar 36 is removed from engagement with the tread of the traction wheel 43. In this position driving power is transmitted from the power unit 44 to the traction wheels. Where driving traction is not desired the control handle is moved to the position of Fig. 24.

Figure 20:
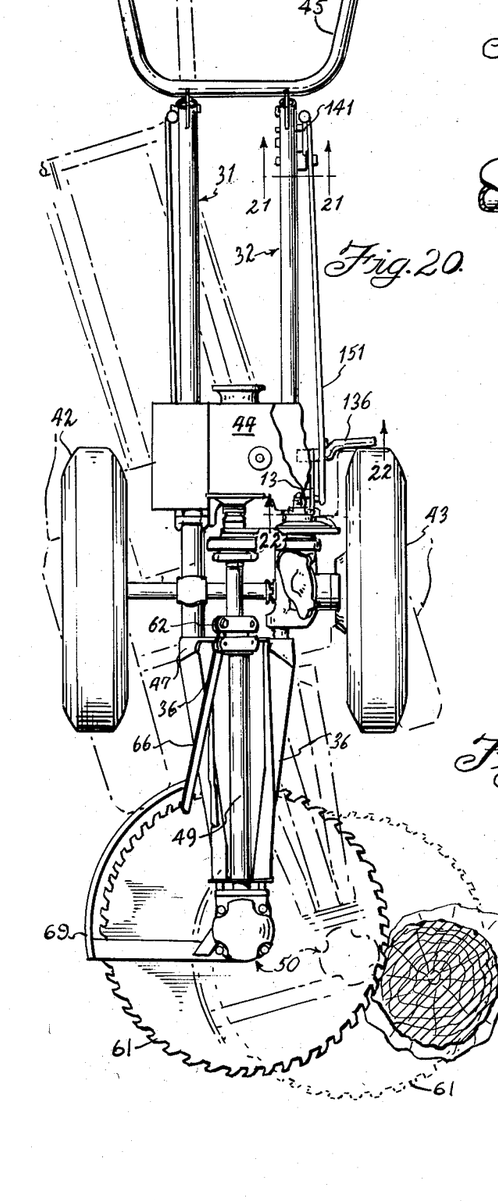
Fig. 20 (Sheet 7) is a top plan view of our invention and showing in broken lines the manner of operation of the same.

To fell trees the saw blade remains in the position above described and after the machine has been wheeled into proper position in relation to the tree to be felled, the control handle 141 is manipulated to move the parts to the position shown in Fig. 23 wherein the clutch 107 is rendered inoperative and the brake bar 136 is caused to press into the tread of traction wheel 43. The said wheel is thereby locked against rotation and the operator may pivot the machine about a vertical axis passing through traction wheel 43 and the point of engagement of the tread of said wheel with the ground. Because the traction wheel 43 remains stationary the operator may swing the saw blade in a dircetion counterclockwise from the solid line to the dotted line position illustrated in Fig. 20 and since the saw blade remains substantially at the same elevation during such movement the blade moves substantially in the same horizontal plane. Accordingly the likelihood of the blade being warped during a sawing operation is substantially eliminated. It will be apparent that if the traction wheel 43 were free to rotate on its axle and move over the terrain in the immediate vicinity of the tree trunk, the angle and elevation of the saw blade would change progressively since the terrain in the immediate vicinity of the tree is uneven and for the most part usually slopes upwardly toward the tree. Thus as the saw would advance toward the center of the tree the elevation and angle of the cut would be changed continuously thereby warping the blade.

After the tree has thus been felled, in order to make a vertical cut so as to cut the felled tree into sections, the position of the saw is changed to a vertical plane like that illustrated by the broken lines in Figs. 1 and 2. This is accomplished by the operator grasping the handle 66 and rotating the L-shaped torque tube assembly 50 90 degrees until the lever 66 is in alinement with the corresponding notch in the indexing plate 48. As will be apparent the angular disposition of the lever 66 and the length of the same provides adequate leverage for facilitating the repositioning of the L-shaped structure 50 with a minimum of effort. For this condition of operation the operating handle 98 is manipulated to render the main clutch 72 operative, while the control handle 141 is manipulated to assume the position illustrated in Fig. 24 in which the brake bar 136 is disengaged from the tread of the traction wheel 43 and the clutch 107 is rendered inoperative so that the machine may be manually moved and urged into the felled tree to be cut into sections. It will be apparent that each of the clutches 72 and 107 may be rendered operative or inoperative independently of the other so that the saw blade may be caused to rotate whether or not the traction wheels are being driven. Correspondingly, power may be transmitted to the traction wheels 42 and 43 for moving the saw over a surface whether or not the saw blade itself is being caused to be driven.

We claim:

1. In a self-propelled power saw comprising a frame, a power unit supported on said frame and a pair of traction wheels supporting said frame, power transmission means connecting said power unit to said wheels, said power transmission means including a clutch for transmitting power from said power unit to said wheels, means for operating said clutch, a rockably mounted brake bar on said frame, said bar having an offset portion adapted to engage one of said wheels for braking the same, a crank arm fixed intermediate the ends thereof to said brake bar, linkage means connecting the clutch operating means with one end of said crank arm, a pivotally mounted operating handle on said frame, a pull rod connecting the other end of said crank arm with said operating handle, said operating handle when moved to one position effecting rocking of said crank arm simultaneously to render said clutch operative and to disengage said brake bar from said wheel, said operating handle when moved to another position rocking said crank arm to render said clutch inoperative and to move said brake bar into braking relation with said wheel.

2. In a self-propelled vehicle comprising a frame, a power unit supported on said frame and a pair of traction wheels supporting said frame, power transmission means connecting said power unit to said wheels, said power transmission means including a clutch for transmitting power from said power unit to said wheels, a pivotally mounted yoke associated with said clutch for operating the same, a brake bar rockably supported on said frame and having an offset portion extending transversely of one of said wheels and adapted for engagement therewith to brake the same, a crank arm fixed intermediately thereof to said brake bar, linkage means connecting said yoke and one end of said crank arm, a pivotally mounted operating lever on said arm, a pull rod connecting the other end of said arm with said operating lever and affording a toggle arrangement with said crank arm and said linkage means, said operating lever when moved to one position effecting movement of associated parts to render said clutch operable and said brake bar inoperable, said operating lever when moved to another position effecting movement of associated parts to render said clutch inoperable and said brake bar operable.

References Cited in the file of this patent

UNITED STATES PATENTS

| 373,850 | Pope | Nov. 29, 1887 |
| 652,940 | Whitney | July 3, 1900 |
| 1,487,086 | Bruner | Mar. 18, 1924 |
| 2,412,704 | Jaques | Dec. 17, 1946 |
| 2,435,192 | Arsneau | Feb. 3, 1948 |
| 2,461,188 | Stoner | Feb. 8, 1949 |
| 2,520,835 | England | Aug. 29, 1950 |
| 2,524,466 | Moss et al. | Oct. 3, 1950 |
| 2,601,752 | Rose | July 1, 1952 |
| 2,613,698 | Gregson | Oct. 14, 1952 |
| 2,650,396 | Koren | Sept. 1, 1953 |
| 2,664,925 | Jacobs et al. | Jan. 5, 1954 |

FOREIGN PATENTS

| 139,339 | Australia | Nov. 9, 1950 |